UNITED STATES PATENT OFFICE.

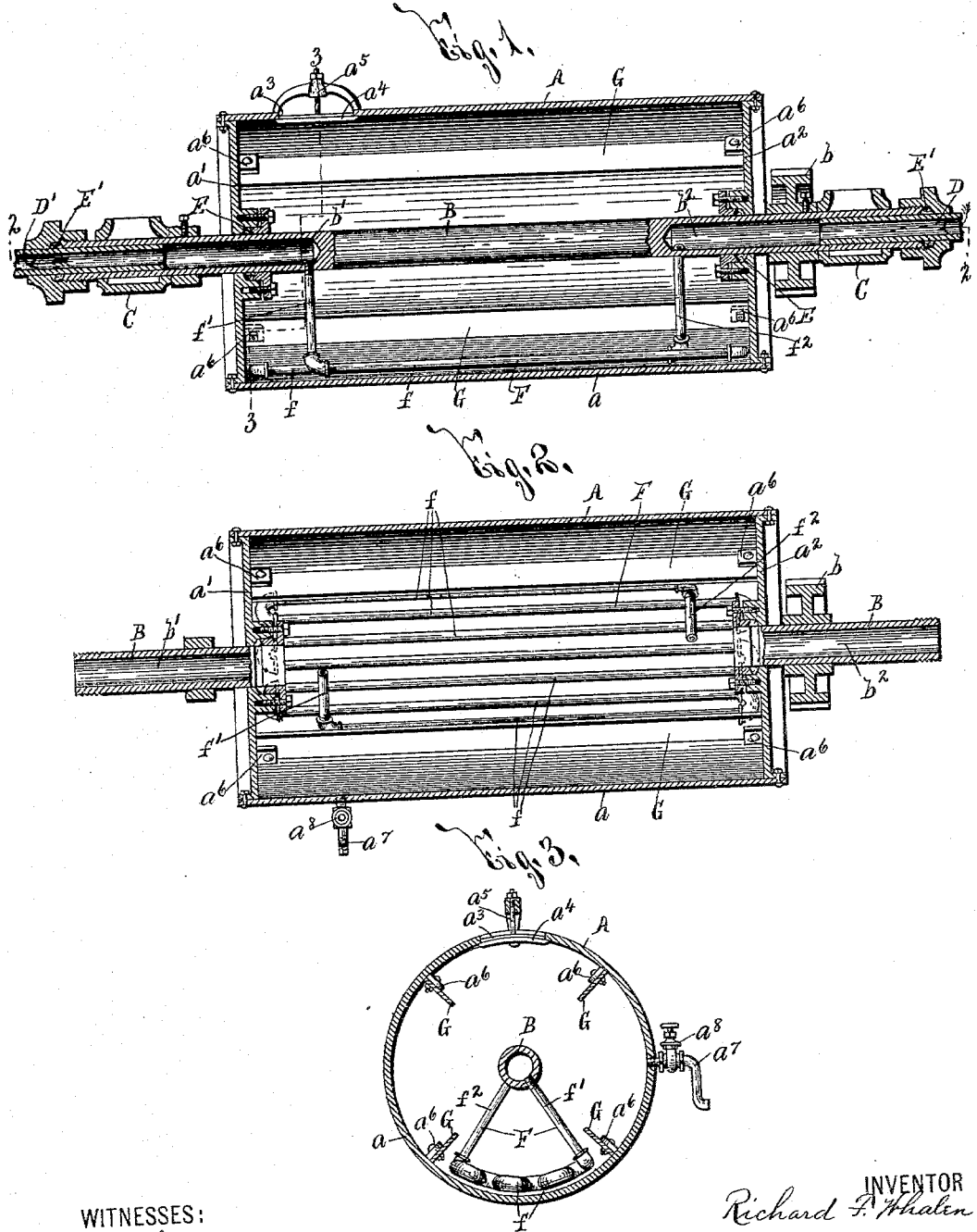

RICHARD F. WHALEN, OF ROCHESTER, NEW YORK.

DISSOLVER.

SPECIFICATION forming part of Letters Patent No. 545,259, dated August 27, 1895.

Application filed November 26, 1894. Serial No. 529,993. (No model.)

*To all whom it may concern:*

Be it known that I, RICHARD F. WHALEN, of Rochester, in the county of Monroe, in the State of New York, have invented new and useful Improvements in Dissolvers, of which the following, taken in connection with the accompanying drawings, is a full, clear, and exact description.

My invention relates to improvements in dissolvers particularly applicable for use in dissolving sugar, licorice, &c., in the manufacture of sweetening and flavoring compounds for tobacco, and has for its object the production of a simple, durable, and efficient device in which the material to be dissolved is combined with the requisite amount of liquid without liability of material variation in the consistency and quality of the final mixture; and to this end it consists, essentially, in the general construction and arrangement of the component parts of the dissolver, all as hereinafter more particularly described, and pointed out in the claims.

In describing this invention reference is had to the accompanying drawings, forming a part of this specification, in which like letters indicate corresponding parts in all the views.

Figure 1 is a longitudinal vertical sectional view, partly in elevation, of my improved dissolver. Fig. 2 is a similar sectional view taken on line 2 2, Fig. 1, the central portion of the shaft being broken away and the bearings and stuffing-boxes for its opposite hollow extremities being removed; and Fig. 3 is a vertical sectional view taken on line 3 3, Fig. 1.

In the operation of dissolving substances it is usually customary to place both the substance and the dissolving liquid in an open vessel and then heat and agitate the mixture. During this action a considerable amount of the liquid is evaporated, and it is therefore absolutely impossible to produce uniform results, even though additional liquid is added. Moreover, when dissolving comparatively hard substances the operation is very slow, as only the outer surface becomes softened, necessitating constant wearing away of the softened surface until the hard interior is finally softened and dissolved. Consequently the manufacturers of sweetening and flavoring compounds for tobacco in which licorice is used insist that the licorice sold to them, although handled and stored with great inconvenience and difficulty, shall be furnished in as soft a condition as possible, even though the manufacturers of the licorice much prefer to make their product as hard and stable as possible, owing to greater convenience in handling, packing, storing, and shipping. By my invention the material to be dissolved is placed with the requisite amount of liquid within a closed receptacle, which prevents evaporation of the liquid and is of such construction that the material to be dissolved, even though excessively hard, is continually and practically abraded and agitated and soon entirely dissolved.

A represents the outer shell of my dissolver, which is of suitable form, size, and construction and is here shown as consisting of a substantially horizontal tubular wall $a$ and opposite heads or ends $a'$ $a^2$. The wall $a$ is preferably formed of copper or other non-corrosive material, although iron and similar metals may be used, if desired, and the heads or ends $a'$ $a^2$ may be formed of suitable cast metal lined with copper or other non-corrosive material.

The shell A is provided with a suitable manhole $a^3$, formed, preferably, in its tubular wall $a$ and closed by a cap $a^4$, held in position by a clamping device $a^5$, of any desirable form, size, and construction, unnecessary to herein further illustrate or describe.

The shell A is revolved by any suitable mechanism and is here shown as supported upon a substantially horizontal shaft B, having a pinion $b$ provided upon one extremity. The opposite extremities of the shaft B are journaled in bearings C, of any suitable form, size, and construction, and are preferably formed hollow, being provided with inwardly-extending chambers $b'$ $b^2$, extending beyond the inner faces of the heads or ends $a'$ $a^2$.

Suitable steam inlet and outlet pipes D D' are connected in any desired manner to the opposite hollow extremities of the shaft B for discharging a suitable heating fluid, as steam, within the chamber in one extremity thereof and withdrawing said fluid from the other chamber.

Stuffing-boxes E E' or other similar devices projecting, preferably, from the inner faces of the heads or ends $a'$ $a^2$ are used for preventing the escape of the heating fluid from the extremities of the shaft B.

The materials within the receptacle A are heated by a suitable pipe F, having a series of substantially horizontal coils $f f$ arranged between a pair of adjacent supports or strips, presently described, in proximity to the inner face of a portion of the tubular wall $a$, and laterally-extending extremities $f'$ $f^2$, connected, respectively, to the chambers $b'$ $b^2$ for completing the passage for the heating fluid within the receptacle A. The ends $f'$ $f^2$ of the heating-pipe F are preferably formed with detachable extremities or other suitable connecting means for permitting connection of said pipe to the shaft B and the disengagement of said parts when desired to remove, repair, or cleanse the pipe F.

The materials within the receptacle A are engaged and agitated by suitable supports G G, projecting from the inner face of the tubular wall $a$ and consisting, preferably, of strips having their opposite ends detachably secured to lugs $a^6$ $a^6$, projecting from the inner faces of the heads $a'$ $a^2$. The supports or strips G G are preferably arranged substantially equidistant within the receptacle A in substantially horizontal planes, and, as said receptacle is revolved, successively engage and elevate the material to be dissolved, thereby abrading the same more or less and removing its softened surface, and as the supports or strips are elevated the substances engaged thereby are permitted to fall by gravity through the heated liquid, and are again elevated and dropped until entirely dissolved. The mixture, when sufficiently treated, may be withdrawn from the receptacle A either through the manhole $a^3$ or any other suitable outlet, as a pipe $a^7$, provided with a valve $a^8$.

By the use of my invention the material to be dissolved, even though extremely hard, is soon sufficiently acted upon, and the final product is always substantially uniform, as the escape of the dissolving liquid is entirely prevented. During the operation of my dissolver more or less pressure is generated within its inclosing shell, and the dissolution of the material to be affected is considerably facilitated by said pressure.

It is obvious that a dissolver of this construction may be used for dissolving various substances, and that it is not restricted for use in dissolving sugar, licorice, &c., used in the manufacture of sweetening and flavoring compounds for tobacco.

The operation of my dissolver will be readily perceived upon reference to the foregoing description and the accompanying drawings, and it will be particularly noted that it is durable and efficient in operation. It is evident, however, that its detail construction, as clearly indicated in the foregoing description, may be more or less varied without departing from the spirit of my invention.

Having thus fully described my invention, what I claim as new, and desire to secure by Letters Patent, is—

1. A dissolver for tobacco flavorings, embodying a rotative tightly-closed shell or casing for receiving the fluid and material to be dissolved, strips extending lengthwise of the shell and projecting from its inner periphery, said strips serving to engage and lift the material to be dissolved and to abrade the surface of the same and heating pipes having coils arranged between a pair of said strips, substantially as described.

2. A dissolver for tobacco flavorings, embodying a rotary tightly-closed casing for receiving the material to be dissolved, strips extending substantially horizontally within said casing and serving to engage and lift the material to be dissolved and to abrade the surface of the same, heating pipes within said casing, said heating pipes being arranged horizontally between two adjacent strips only, and inlet and outlet pipes connected with said heating pipes, substantially as described.

3. A dissolver for tobacco flavoring comprising a substantially horizontal closed shell for receiving the material to be dissolved having the inner faces of its opposite heads or ends provided with projecting lugs, means for revolving the shell, supports or strips for engaging and agitating the material to be dissolved projecting from the inner face of the shell and having their opposite ends fixed to said lugs, a heating pipe for heating the material to be dissolved having a series of substantially horizontal coils arranged in proximity to the inner face of the shell and only between two adjacent supports or strips and laterally extending ends connected to the hollow extremities of the shaft, and inlet and outlet pipes for the heating fluid connected to the opposite extremities of the shaft, substantially as set forth.

In testimony whereof I have hereunto signed my name, in the presence of two attesting witnesses, at Rochester, in the county of Monroe, in the State of New York, this 14th day of November, 1894.

RICHARD F. WHALEN.

Witnesses:
EDWARD O'GRADY,
K. H. THEOBALD.